(12) United States Patent
Li et al.

(10) Patent No.: US 8,009,931 B2
(45) Date of Patent: Aug. 30, 2011

(54) REAL-TIME PROCESSING OF GRAYSCALE IMAGE DATA

(75) Inventors: Xing Li, Webster, NY (US); Daniel A Mohabir, Walworth, NY (US); Roger L Triplett, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 69 days.

(21) Appl. No.: 12/418,419

(22) Filed: Apr. 3, 2009

(65) Prior Publication Data
US 2009/0185228 A1 Jul. 23, 2009

Related U.S. Application Data

(63) Continuation of application No. 10/923,388, filed on Aug. 21, 2004, now abandoned.

(51) Int. Cl.
*G06K 9/36* (2006.01)
*G06K 15/00* (2006.01)

(52) U.S. Cl. .................... 382/289; 358/3.06

(58) Field of Classification Search ............... 382/289, 382/290, 291, 296, 232, 282, 312, 203; 358/474, 358/488, 452, 493, 3.26, 3.06; 702/151; 345/596
See application file for complete search history.

(56) References Cited

U.S. PATENT DOCUMENTS

| | | | |
|---|---|---|---|
| 4,577,235 A | 3/1986 | Kannapell et al. | |
| 5,166,810 A | 11/1992 | Sorimachi et al. | |
| 5,323,473 A | 6/1994 | Lau | |
| 5,355,420 A | 10/1994 | Bloomberg et al. | |
| 5,442,459 A | 8/1995 | Gahang | |
| 5,491,759 A | 2/1996 | Nagao et al. | |
| 5,647,026 A | 7/1997 | Kwarta | |
| 5,748,344 A | 5/1998 | Rees | |
| 5,805,728 A | 9/1998 | Munesada et al. | |
| 5,818,976 A | 10/1998 | Pasco et al. | |
| 6,005,680 A | 12/1999 | Luther et al. | |
| 6,064,778 A | 5/2000 | Pasco et al. | |
| 6,198,845 B1 | 3/2001 | Tse et al. | |
| 6,621,599 B1 | 9/2003 | Newell | |
| 6,674,899 B2 | 1/2004 | Nagarajan et al. | |
| 6,744,536 B2 | 6/2004 | Buchar et al. | |
| 6,753,983 B2 | 6/2004 | Chen | |
| 6,782,129 B1 | 8/2004 | Li et al. | |
| 6,954,290 B1 | 10/2005 | Braudaway et al. | |
| 6,983,218 B2 | 1/2006 | Ruiz et al. | |
| 7,058,222 B2 | 6/2006 | Li et al. | |
| 7,062,093 B2 | 6/2006 | Steger | |
| 7,145,699 B2 * | 12/2006 | Dolan | 358/452 |
| 7,200,285 B2 | 4/2007 | Li et al. | |
| 7,215,824 B2 | 5/2007 | Chiu | |
| 7,336,404 B2 | 2/2008 | Benham | |
| 2001/0022678 A1 | 9/2001 | Leclerc et al. | |
| 2002/0057838 A1 | 5/2002 | Steger | |
| 2004/0114147 A1 | 6/2004 | Yeoh et al. | |
| 2004/0263915 A1 | 12/2004 | Park | |
| 2006/0039629 A1 | 2/2006 | Li et al. | |
| 2006/0098243 A1 | 5/2006 | Ahmed et al. | |

* cited by examiner

*Primary Examiner* — Yon Couso
(74) *Attorney, Agent, or Firm* — Philip E. Blair; Fleit Gibbons Gutman Bongini & Bianco P.L.

(57) ABSTRACT

In a digital reproduction system incorporating a single pass scanner, accurate image processing results from processing a subset of grayscale image data. More specifically, scanlines that correspond to the leading edge of a document are stored and processed to detect skew and to obtain an appropriate correction. The lead edge correction is then applied to the entire grayscale image. Accordingly, the present systems and methods eliminate skew from grayscale images in real-time. The corrected image is rendered to binary and stored in electronic pre-collation memory and cropping, masking and other image editing operations can be performed on the binary image data before the image is printed.

7 Claims, 5 Drawing Sheets

REAL-TIME PROCESSING OF GRAYSCALE IMAGE DATA

CROSS-REFERENCE TO RELATED APPLICATIONS

This is a continuation of U.S. application Ser. No. 10/923,388 filed Aug. 21, 2004 by the same inventors, and claims priority therefrom.

TECHNOLOGY

Illustrated herein, generally, are systems and methods for processing scanned image data and more particularly, the real-time processing of grayscale data that represents an entire scanned image is disclosed.

BACKGROUND

Digital scanners are commonly used to capture images from a hardcopy medium. In a typical scanning operation, light from the scanner illuminates the surface of an original document and an image sensor moving past the document detects the intensity of light reflected from each location in the image and stores it as a proportionate electrical charge at a corresponding pixel location. The analog charges are passed to an image processor where they are quantized to grayscale levels, each of which is represented by a multi-bit digital value. The number of bits that are assigned to each grayscale level determines the number of intensity levels that can be generated by the scanner. For example, in a scanner that represents grayscale levels using 8 bit words will be able to capture 256 ($2^8$) different intensity levels. The value for the grayscale level that provides the closest match to the intensity of reflected light is assigned to the pixel corresponding to each location in the image. Thus, scanning captures analog input images by generating a stream of multi-bit values, with each location in the image being represented by a multi-bit digital word.

One or more scanners, printers, video displays and/or computer storage devices are often connected via a communications network, thereby providing a digital reproduction system. For example, a digital copier may incorporate a scanner and a digital printer. While scanners capture hundreds of light intensity levels, digital output devices usually generate relatively few levels of output. For example, most digital printers generate binary output, wherein a single bit is assigned to each pixel and marking material is either withheld from or applied to the pixel depending upon the assigned value. The grayscale data is rendered to binary format and stored in memory, where it can be retrieved by the printer for output. While it is possible to print data as it is rendered, storing it first provides several advantages. For one, when the data is stored, it is possible to print multiple copies of the same page without having to repeatedly re-scan the original document. It is also easier to transfer stored data between devices, as it can be compressed and decompressed.

Grayscale image data is often processed for improved image quality. Image processing is preferably applied before the image is rendered, to avoid data loss. Well known image processing techniques are performed to improve image contrast, sharpness, color and also to eliminate scanning artifacts, hole punches and other undesirable data. For example, skew correction is a well known imaging process that may be applied to remove skew from image data that is captured from an original document that became rotated relative to the image sensor before it was captured. Skewed images are unappealing to the viewer and they are also difficult to process in optical character recognition processes. The contents of an image are viewed in relation to the edges of the page on which it is printed. Thus, skew can be eliminated by aligning the image with the edge of the document. More specifically, skew can be eliminated by detecting the magnitude and direction of the document rotation and applying a corresponding counter rotation to the image data.

Cropping, another well known imaging process, is performed to remove image data that represents the document transport, scanner platen or other hardware that is present in the scanning when the document is scanned. To remove this extraneous data, the entire scan is processed to determine the size of the original document and to pinpoint its location inside the scan. The data that lies outside of the identified region can then be deleted before the image is printed.

An accurate and robust digital image processing technique analyzes the entire scan to select the data that is most relevant for processing. However, to process an entire scan, all of the grayscale data must be available when each scanline is processed. One-pass scanners process image data "on-the-fly," i.e., the grayscale data is generated, processed and rendered in real-time. It would be very expensive to process and store the entire volume of grayscale image data for an entire scan (i.e., multi-bit grayscale values for every pixel in the image) quickly enough to keep pace with the scanning rate. Instead, one-pass scanners almost always select the data on which processing is based by analyzing only a subset of the data in the scan. Unfortunately, it is difficult to isolate the subset of grayscale data that will best represent the entire scan for each specific process and thus, image processing that is based upon partial analyses often produce unreliable results.

Therefore, it is desirable to provide systems and methods for processing a digital image based upon an analysis of the grayscale image data that is generated for an entire scan. More specifically, it is desirable to provide systems and methods for processing grayscale image data for an entire scan to locate the corners of the document without having to store the entire grayscale image in memory. It is also desirable to process grayscale data to measure the skew in a scanned image and to eliminate the skew before the image is rendered for output.

PRIOR ART

U.S. Pat. No. 5,528,387 discloses a system for electronically registering an image on an input document. The system detects the corners and center of the leading edge of the document being scanned; calculates the skew angle of the document; and rotates the electronic representation of the input image based on the calculated skew angle.

U.S. Pat. No. 6,741,741 discloses detecting document edges by scanning a portion of the document against a substantially light reflecting backing and then against a substantially light absorbing backing document edges are detected by comparing the data from the two scans.

U.S. Pat. No. 5,245,676, discloses calculating skew angle by choosing pixel color transitions, selecting an alignment, determining the locations of pixel color transition points for the selected alignment; and calculating the power of the alignment from the locations of the pixel color transition points.

U.S. Pat. No. 6,310,984 describes a method of automatically determining a skew angle of a scanned document by defining left and right image boundaries for groups of scan lines; digitally forming edge segments by extending image boundaries between successive groups of scan lines; and calculating a slope of all of the digitally formed edge segments that are longer than a predetermined length.

U.S. Pat. No. 6,137,989 describes an apparatus and method for correcting top edge sheet mis-registration using a sensor array, in which an array sensor is placed in the paper path prior to transfer. A signal is generated indicating the position of the sheet. As a function of the signal the print controller causes the image to be exposed and developed on the photoreceptor in alignment with the sheet position. The aligned image is then transferred to the sheet.

U.S. Pat. No. 5,697,609 describes a registering device for an electrophotographic printing machine in which a lead edge sensor detects when a sheet is located within a pair of steerable drive nips that are turned such that the sheet is transported toward a side registration sensor located in the paper path. The actuator causes the steerable nips to be straightened when the side registration sensor detects the edge of the sheet. The sheet may also be forwarded to a second, higher accuracy registration device for final registration.

SUMMARY OF THE INVENTION

Aspects disclosed herein include a method of processing images for digital reproduction including providing grayscale image data captured from an original document; identifying a subset of the grayscale image data that excludes substantially all of the grayscale image data that does not correspond to an edge of the original document; and analyzing the grayscale image data subset to locate at least one complete edge of the original document.

In one example embodiment, the present method for processing grayscale image data to improve image quality involves the following. An original document is provided to a digital reproduction system having a raster input scanner as its image source and a xerographic digital printer as its output device. The original document is scanned using the raster input scanner to obtain an image scan of the original document. The raster input scanner converts the image scan to grayscale image data representing an image of a scanning area that has the original document captured inside. Skew is detected in at least one initially scanned line of the image scan by analyzing a subset of the grayscale image data that excludes substantially all of the grayscale data that does not correspond to the lead edge such that only the grayscale data that represents the lead edge of the original document is processed to detect skew for the entire document image and to determine the appropriate correction to be applied. The amount of skew correction is applied. The skew corrected image data has been skew corrected based upon the skew detected in the initially scanned line with at least a portion of the skew being eliminated from the grayscale image data in real-time. The skew corrected image data is converted to an output device format and stored to memory. The output device formatted image data is eliminated that does not correspond to data displayed on the original document. Thereafter, the formatted image data is printed using the output device.

A system for processing grayscale image data to improve image quality in a digital document reproduction device is also disclosed. In one embodiment the system comprises an image processor configured to receives an image scan of an original document and converts the image scan to grayscale image data; a skew detection module that detects skew in at least one initially scanned line of the image scan by analyzing a grayscale image data subset that excludes substantially all of the grayscale image data that does not correspond to the lead edge such that only the grayscale data that represents the lead edge of the original document is processed to detect skew for the entire document image and to determine the appropriate correction to be applied; a skew correction module that generates modified image data which corresponds to the grayscale image data, the image data being skew corrected based upon the skew detected in the initially scanned lines, with at least a portion of the skew being eliminated from the grayscale image data in real-time; an image rendering module that converts the skew corrected grayscale image data to an output device format for use by a digital output device; a memory for storing the formatted image data; an image editing module that (i) retrieves the output formatted image data from the memory; and (ii) removes output formatted image data that is located outside a border of the document; and an output device configured to provide visible reproductions of the output device formatted image data.

DETAILED DESCRIPTION

Figure 1:
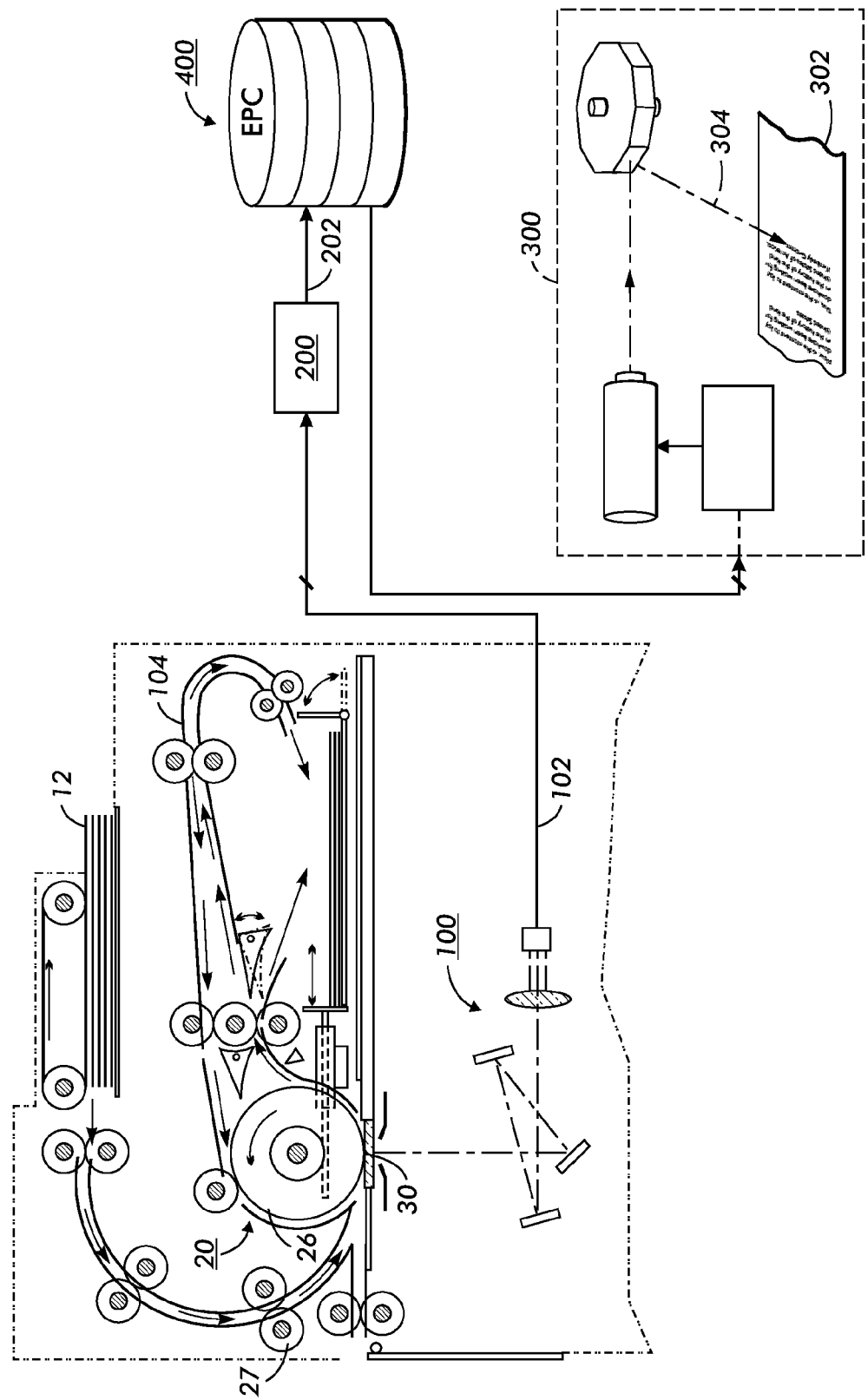
FIG. 1 provides one example of a system for digitally reproducing hardcopy images.

For a general understanding of the present invention, reference is made to the drawings. In the drawings, like reference numerals have been used throughout to designate identical elements. In describing the present invention, the following term(s) have been used in the description:

A "raster output scanner," also referred to as a "RIS" or a "scanner" is a device that captures images from a hardcopy medium and converts them to digital format. The term "scanner" includes any such device, whether flat-bed, hand-held, feed-in, and includes devices that capture images in color or only in black-and-white.

Scanners move across an image in the "fast-scan" direction collecting data from a single line in the image, then back to the start point, take a step in the "slow-scan" direction (i.e. the direction normal to the fast-scan direction) and collect data from the next line in the image.

A "pixel" is the smallest unit of visual information that represents a corresponding area in an original image. A "pixel value" is a numerical value that indicates the color and/or intensity displayed at a pixel. A "scanline" is the visual information that represents an entire fast-scan direction line in the original image.

Resolution is the number of pixels displayed by an output device. For a video display, resolution is typically expressed as the number of pixels on the horizontal axis and the number on the vertical axis. Printer resolution is often expressed in terms of "dots-per-inch" i.e., the number of droplets of marking material that can be printed in an inch on the page. Print resolution is often, but not necessarily, the same in both directions.

"Data" refers to physical signals that indicate or include information. Data is typically processed by a set of instructions, such as a software program or application, to generate output. The term "data" includes data existing in any physical form, and includes data that are transitory or are in the process of being stored or transmitted. For example, data could exist as electromagnetic or other transmitted signals or as signals stored in electronic, magnetic, or other form. For example, a binary item of data, also referred to as a "bit," has one of two values, interchangeably referred to as "1" and "0" or "ON" and "OFF" or "high" and "low."

An "image" is generally a pattern of physical light that may include characters, words, and text as well as other features such as graphics. An entire image is typically represented by a plurality of pixels.

"Image data" refers to information that represents an image. "Original image data" is image data that is delivered to a system or device by an external source. "Modified image data" is image data that is generated by altering one or more values provided by original image data. "Grayscale image data" refers to image data that represents and black and white and/or color images using multiple luminance levels.

"Memory" is any circuitry that can store data, and may include local and remote memory and input/output devices. Examples include semiconductor ROMs, RAMs, and storage medium access devices with data storage media that they can access.

An "edge" refers to the boundary of the original document. A "corner" refers to the point of intersection of two edges. The "lead edge" of a document is the first captured edge of the document, which lies parallel to the image sensor.

"Continuous tone" generally refers to an unscreened image, such as a photograph or sketch. The output of scanned continuous tone images typically requires the use of the grayscale levels.

"Skew" is introduced when an image becomes rotated inside the scan area, with respect to an identified reference line, e.g., the fast-scan axis. The "skew angle" is the angle measured between the reference line and the relevant line in the image.

The processing of data in "real-time" means that the data is processed as it is received.

The "scanning surface" is the entire surface that is illuminated and captured during scanning, typically a glass platen located next to the image sensor.

"Scan area" refers to the entire area that is captured by the scanner, which includes the document bearing the image and the scanner background.

Generally, digital reproduction systems include an image source, which provides grayscale data that represents an original image; an image processor, which performs various image modifications including those required to prepare the grayscale data for output, and stores the processed data in electronic pre-collation memory; and an output device, which retrieves the output formatted data and displays it in a viewable format. FIG. 1 is an illustration of a digital reproduction system 10 that has a raster input scanner (RIS) 100 as its image source and a xerographic digital printer 300 as its output device. System 10 reproduces images that are presented on a hardcopy medium by scanning original documents 12 line-by-line, detecting the intensity of light reflected from each discrete location and storing it as a proportionate electrical charge in a corresponding pixel location. The analog charges are then quantized to generate grayscale image data 102 that represents the intensity of the reflected light.

Original documents 12 are often automatically transported to the scanning area via a constant velocity transport ("CVT") system 104, which includes a backing roll 20 rotatably mounted above the scanning area of RIS 100 for receiving original documents 12 from one or more transport rollers 26 and 27 and moving them across scanning area of 30. While the goal is usually to scan only original document 12, RIS 100 always generates image data that represents everything that is in scanning area 30, which often includes backing roll 20 and other scanner hardware. Thus, the grayscale image data generated by RIS 100 represents an image of a scanning area 30 that has an original document 12 captured inside.

While scanners generate grayscale data, output devices often process data in other formats. For example, image data must typically be in binary format before it can be output by a digital printer. Accordingly, system 10 includes an image processor (JP) 200, which converts the grayscale image data 102 generated by RIS 100 to binary format 202. The binary image data is then stored in EPC 400, where it can be retrieved by printer 300 to provide printed copies.

To produce hardcopy reproductions, printer 300 retrieves binary image data 20 from EPC 400 as a continuous stream of electronic signals and uses it to modulate a light beam 304, which is directed onto the surface of a uniformly charged imaging member 302, discharging it in the locations that receive beam 304 when the light is in the "ON' state. Toner material 306 is brought in contact with the selectively charged imaging member 302, adhering to the charged areas of the imaging member and the toner developed image is then transferred and permanently fixed to a copy sheet. In other words, the binary data retrieved from EPC 400 is transformed to markings that are printed on the output copy sheet. While image data is stored in EPC 400 by IP 200 and retrieved by from EPC by printer 300, it is understood that it is possible to reproduce images transmitting the image data directly from IP 200 to printer 300, by making the image data available via a removable storage device and any other appropriate delivery method.

Figure 2:
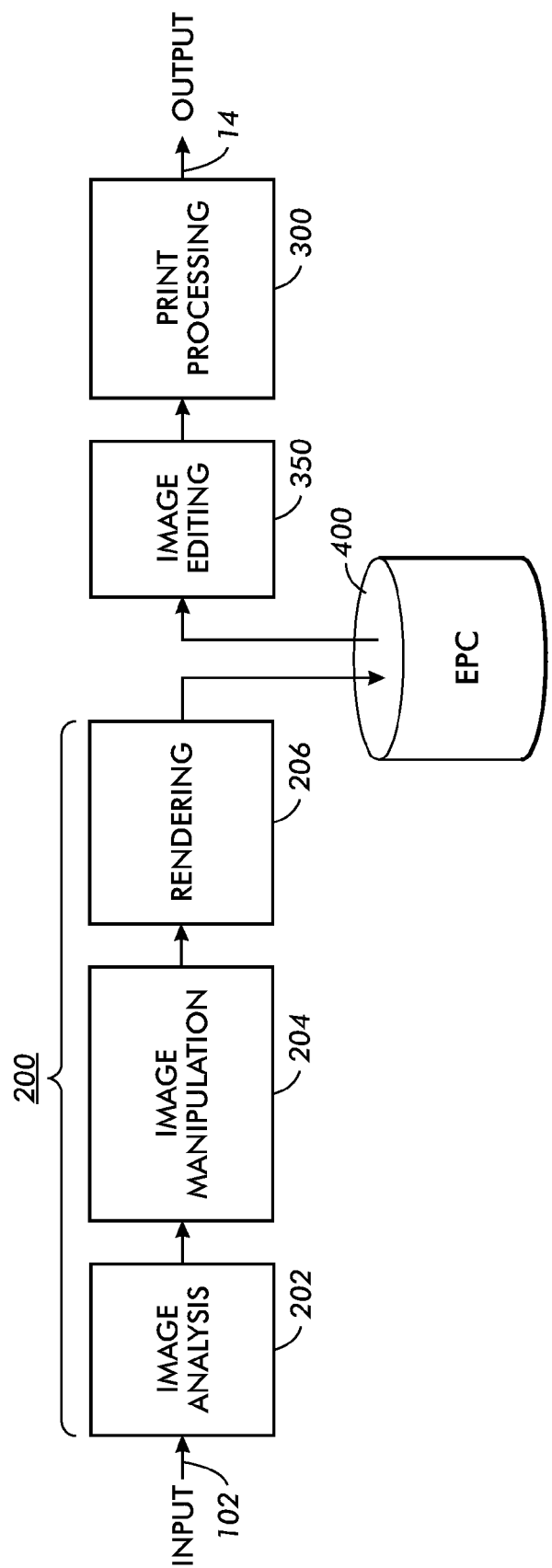
FIG. 2 is a block diagram showing a prior art image processor that may be used to reproduce images in the system shown in FIG. 1.

FIG. 2 provides a general description of the operation of IP 200 of FIG. 1, which receives the grayscale image data 102 from RIS 100 for processing. For simplicity, IP 200 is shown in FIG. 2 as having an image processing module 202, an image manipulation module 204 and an image rendering module 206. However, it is understood that separate and distinct modules are not required, that IP 200 will typically perform numerous other operations and that some or all of those operations may use portions or all of the same data, algorithms, subroutines and other information. Image analysis module 202 performs functions that relate generally to analyzing the image to determine its content, such as background detection and image segmentation. Image manipulation module 204 modifies the grayscale data depending upon its content; and an image rendering module 206 that converts the modified grayscale data to the format used by the output device. It is preferable to modify the data before rendering the image, in order to minimize data losses. However, the rendered image data can be modified if necessary. Once the data is formatted for output it is stored in EPC 400.

Figure 3:
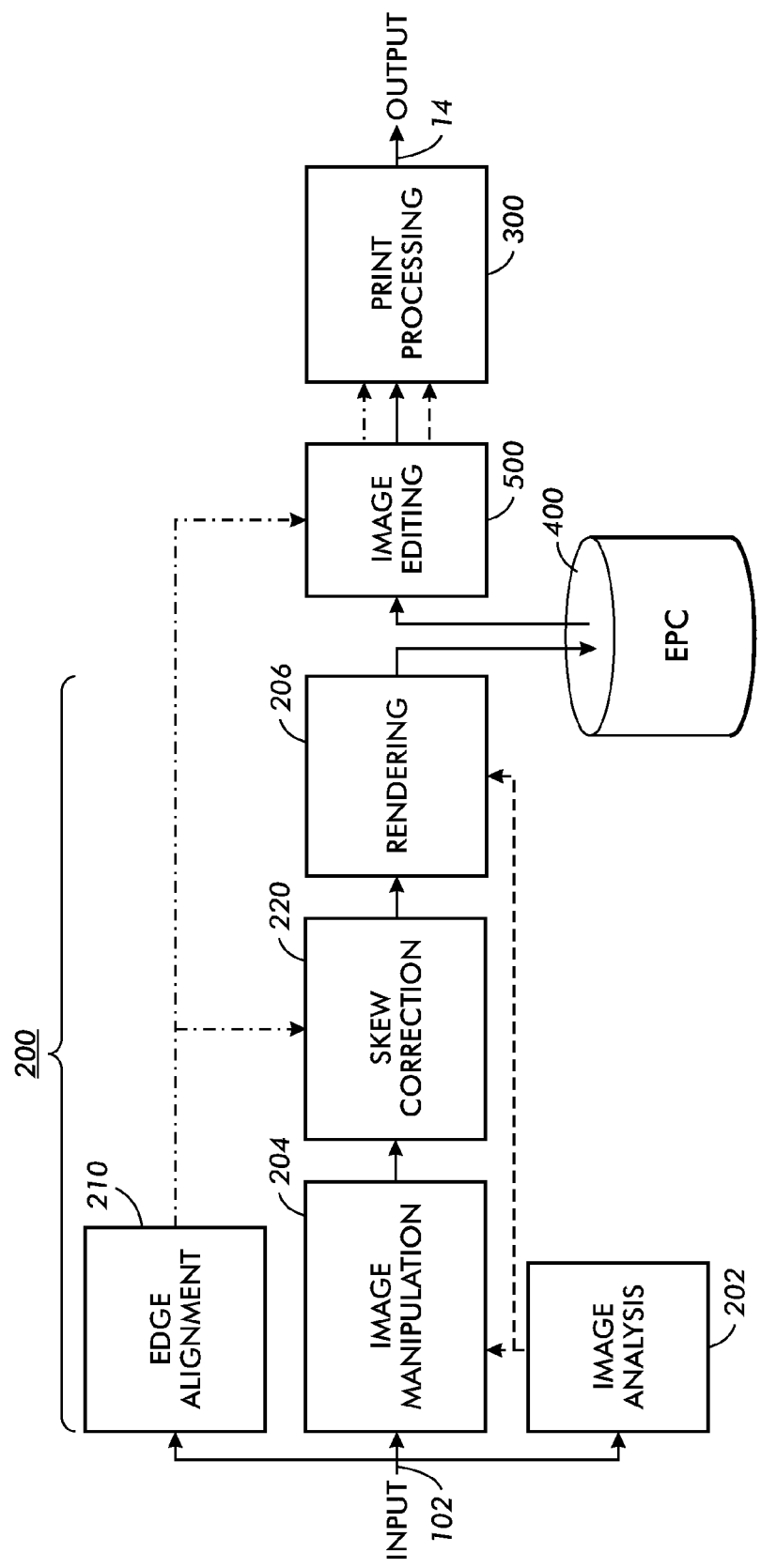
FIG. 3 is a block diagram showing an image processor that may incorporate features of the present systems and methods.

As shown in FIG. 3, system 10 can be modified to provide additional features. More specifically, IP 200 may include skew detection and/or skew correction modules 210 and 220. It is noted that skew detection and correction modules 210 and 220 may each be separate modules that can be added to and removed from system 10, they may be provided as a single module that can be added and removed, or they may be incorporated in IP 200.

Most systems that digitally reproduce images use mechanical systems to maintain proper alignment as the document is transported to the scanning area. While such systems and methods are useful, they are typically unable to eliminate all skew from the document before it is placed on the scanning surface. As such, electronic systems and methods are employed to apply the fine tuning that is necessary to eliminate the remaining skew. Data storage presents a significant challenge to skew correction techniques. More specifically, skew correction requires the storage of all of the data that will be corrected. Thus, many available techniques require storing the entire image in order to eliminate skew. Notably, each line in a skewed image straddles several additional scanlines and thus, skewed images require more storage space than their properly aligned counterparts. Accordingly, skew correction requires additional processing time and storage space, which often dramatically increases costs.

Figure 4:
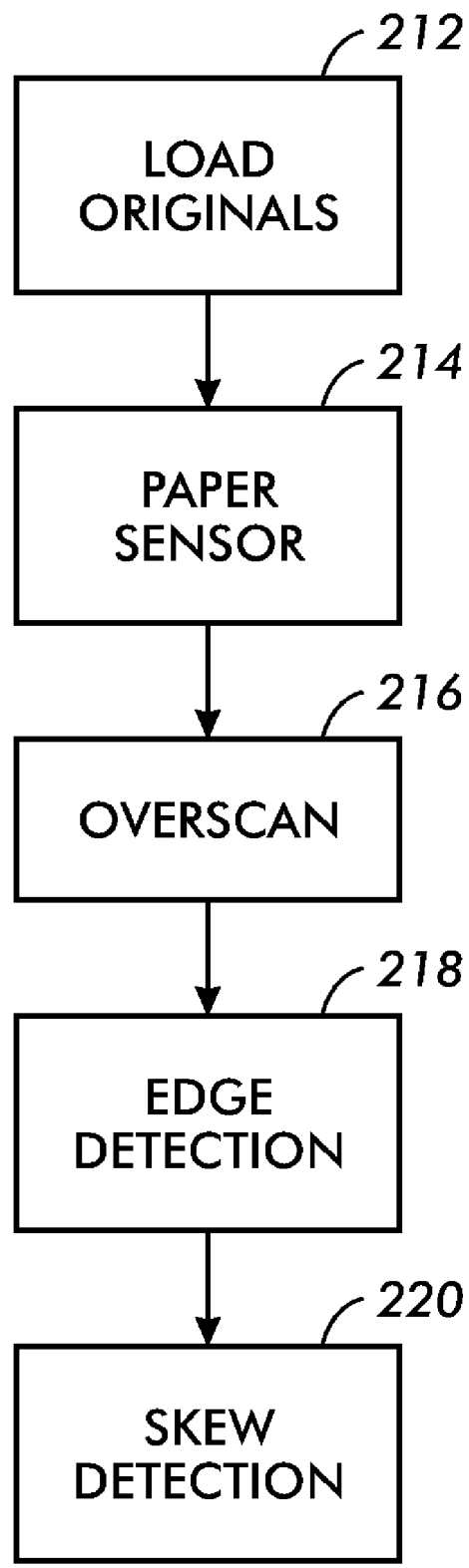
FIG. 4 contains a flow diagram showing operation of a skew correction module that may be used with the present systems and methods.

The present systems and methods isolates a small subset of grayscale data that can be used to a accurately detect and correct skew for the entire image without having to store all of the grayscale data that will be corrected. FIG. 4 is a flow diagram showing operation of skew detection module 210. An original document 12 is positioned for scanning at block 212, causing a paper sensor signal to be generated as shown in block 214. Scanning area 30 is preferably arranged to accommodate original documents of various sizes. As such, the scanning area will usually be larger than the document that is being scanned. RIS 100 "overscans" original document 12, i.e., captures document 12, including all of its edges, as part of scanning area 30.

Edges are found at the boundaries between regions with distinct gray-level properties. In a typical RIS 100 will have a backing roll 20 and other scanner hardware will have coloring that enables it to be easily distinguished from the edges of original document 12. For example, most office documents are printed on white sheets of paper that have brightness levels between 84 and 100. Document edges can be detected fairly easily so long the scanner hardware will be represented by grayscale values that are distinct from those that represent original document 12. In one aspect, the leading edge of the document is identified in block 218 while in another aspect, all four document edges are identified.

Still referring to FIG. 4, the amount of skew that is present in the leading edge is then detected at block 220. As stated earlier, image processing that systems and methods that store all of the grayscale data for an image are too expensive, and those that rely upon the analysis of a subsets of the data that represents an image tend to produce unreliable results. In the present systems and methods, all of the grayscale data that represents the lead edge of the document—and more significantly, only the grayscale data that represents the lead edge of the document—is processed to detect skew for the entire image and to determine the appropriate correction. The correction is then applied to all of the grayscale image data for the entire image. Accordingly, the present systems and methods do not store any grayscale data for locations on the document that lie outside of the leading edge and the storage of large volumes of is not required. However, aligning the image with the edge of the document is a very technique for eliminating skew. Thus, the present methods and systems maintain processing accuracy while dramatically increasing system efficiency.

Once skew in a grayscale image exceeds a predetermined amount, many digital reproduction systems require the original document to be re-scanned without making any attempts to electronically correct the skew. This predetermined value can be used to set the number of scanlines that are analyzed during skew detection. For example, if the document being scanned is 12 inches wide and RIS 100 has a scanning resolution of 600 dpi (i.e., there are 7200 pixels per scanline), a system 10 that will not attempt to electronically correct skew that exceeds 15 milliradians will only apply a correction to an image for which the entire leading edge of the document is certain to be located somewhere within the first 108 scanned lines (7200 pixels×0.015=108 pixels). In one aspect, system 10 analyzes at least 100 scanlines to insure that the entire leading edge is captured. However, it is understood that the systems and methods disclosed can be used if fewer scanlines are processed.

Notably, when an automatic document feeder is provided, the amount of rotation that can be applied to a document that will still reach the scanning area (i.e. without becoming jammed in the paper path) will be limited by the size of the document and the layout of the document transport path. It is also possible to use this maximum rotation to see the number of scanlines that are used to detect skew. Regardless of how it is determined, the maximum skew that will be corrected by system 10 may be a permanent or adjustable value and it may be set by the system manufacturer, a service technician or a system user.

Since the image is processed in real-time, the grayscale data for the lines that are processed to detect skew (i.e., the lead edge) will not be available for correction. Therefore, the grayscale data for those lines are stored in a buffer and the correction is applied to the stored data rather than in real-time as the image is scanned. For example, system 10 may begin to store scanlines when the paper signal is detected and stop storing scanlines when all of the lines that may include the lead edge have been scanned. Once the required scanlines are stored in the buffer, they can be processed to detect the amount of skew that is present in the leading edge. Skew detection methods are well known, and any available method that can apply the correction in real-time can be used. Once skew is detected, a correction can be applied to all of the image data as indicated in block 222. The skew corrected image is rendered to binary and stored in EPC 400 for retrieval by printer 300.

The correction includes a mathematical function that generates the coordinates for each pixel in the skew corrected grayscale image based upon the coordinates of the corresponding pixel in grayscale data 102 that is initially generated by RIS 100. For example, the correction can provide a rotational and translational displacement relative to an identifiable point, e.g. the top left corner of the skew corrected document, and the same displacement will be applied to every input pixel. The algorithm, which will preferably be incorporated in skew correction module 220 (FIG. 3), may be derived using bilinear interpolation of the surrounding pixels, using a nearest neighbor algorithm that chooses the tag output values or any other suitable method. Once skew is detected, a correction can be applied in real-time to eliminate skew in grayscale data for all subsequently scanned lines as they are scanned. The correction can be applied to the data that is stored in the buffer at any time before the image is rendered to binary.

By the time the rendered image is stored into EPC, the edges of the document will have been detected. While the document edges were detected by analyzing grayscale data, their location will not change when the image is rendered. Therefore, the grayscale edge identification can be used to locate the binary data that represents the corners of the document, in which case, the document size and its position inside the scan will be known, and the binary image can be retrieved from EPC 400 and cropped, masked and/or subjected to other image editing operations using the edge locations that are obtained from the overscan.

Figure 5:
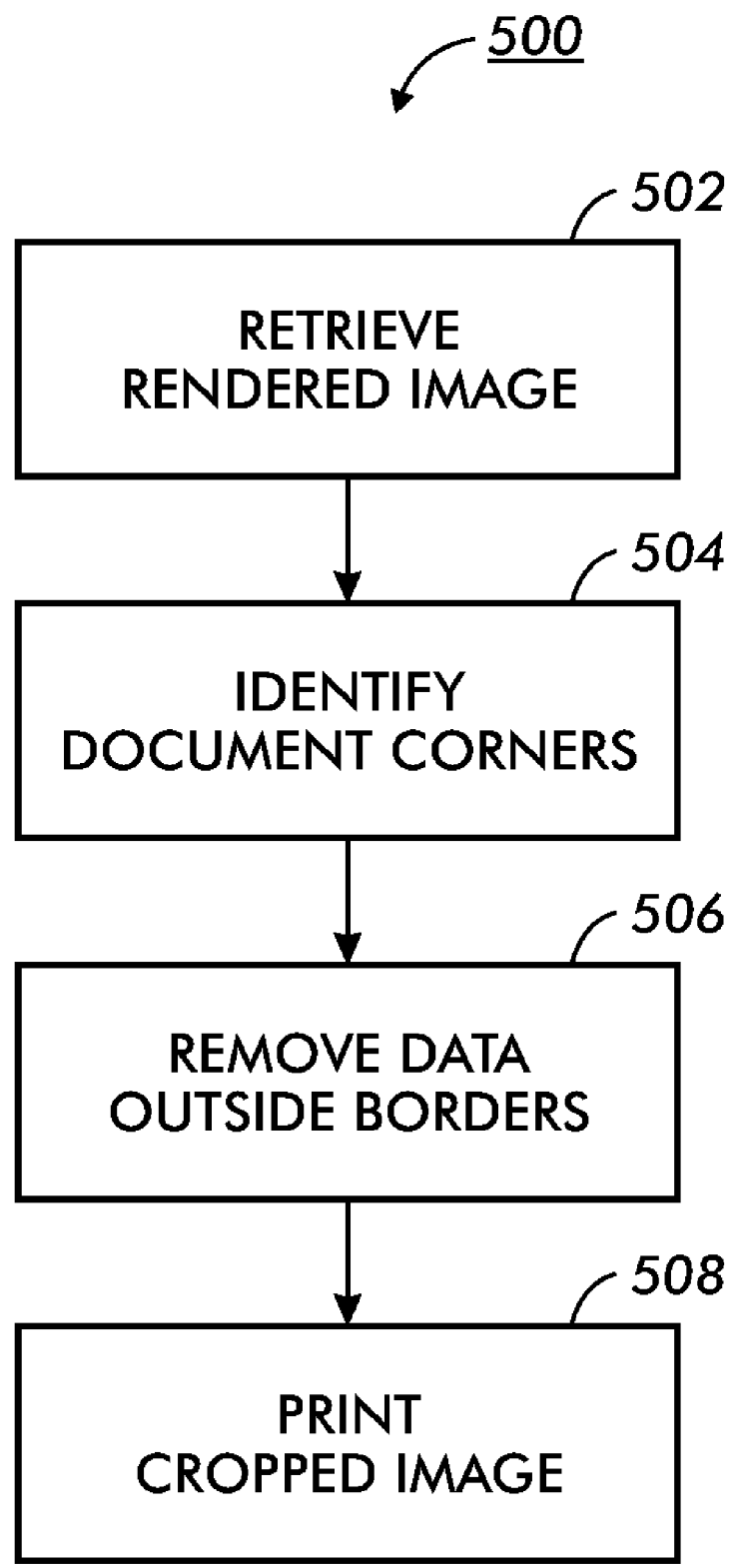
FIG. 5 contains a flow diagram showing operation of an image editing module that may be used with the present systems and methods.

FIG. 5 is a flow diagram showing operation of an image editing module 500 such as that shown in FIG. 3. At block 502, the binary data is retrieved from EPC 400 by printer 300 or another other output device. The locations of the grayscale data corresponding to the edges of original document 12 (detected during overscanning at block 216 of FIG. 4), are used to obtain the coordinates of the four corners of the document. More specifically, the corners are identified at block 504 as having the coordinates of the intersection points for the document edges. Notably, in the example described, these coordinates are obtained from the grayscale data after skew correction has been applied. However, it is understood that cropping and other image editing operations could be performed using coordinates from grayscale data from which skew has not bee eliminated.

Undesired data can be removed from the binary version of the image at block 506. Typically most, and quite often all of the data that is removed will be located outside of the corners of the document. The edited binary image can then be output by printer 300 at block 508. Again, in the example provided, the printed image will be printed without skew, which was eliminated from the grayscale image, and without data that is extraneous to the original document, such as that which represents the document transport, scanner backing and other hardware. The present systems and methods can edit images by automatically detecting image size and location and by using input size entered by a user.

Although the invention has been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. A method for processing grayscale image data to improve image quality in a digital document reproduction device, comprising:
   providing an original document to a digital reproduction system having a raster input scanner as its image source and a xerographic digital printer as its output device;
   scanning said original document using said raster input scanner to obtain an image scan of said original document, said raster input scanner converting said image scan to grayscale image data representing an image of a scanning area that has said original document captured inside;
   detecting skew in at least one initially scanned line of said image scan by analyzing a subset of said grayscale image data that excludes substantially all of said grayscale image data that does not correspond to said lead edge such that only the grayscale data that represents the lead edge of said original document is processed to detect skew for the entire document image and to determine the appropriate amount of skew correction to be applied;
   applying said determined amount of skew correction to said grayscale image data, said correction being based upon the skew detected in said initially scanned line with at least a portion of said skew being eliminated from said grayscale image data in real-time;
   converting said skew corrected grayscale image data to an output device format for use by a digital output device;
   storing said output device formatted image data to a memory;
   eliminating all of said output device formatted image data corresponding to data positioned outside a perimeter of said original document; and
   printing said output device formatted image data using said output device.

2. method of claim 1, wherein said grayscale image data subset consists of all of the pixels in the first 100 scanlines.

3. A system for processing grayscale image data to improve image quality in a digital document reproduction device, comprising:
   an image processor configured to receives an image scan of an original document and converts said image scan to grayscale image data;
   a skew detection module that detects skew in at least one initially scanned line of said image scan by analyzing a grayscale image data subset that excludes substantially all of said grayscale image data that does not correspond to said lead edge such that only the grayscale data that represents the lead edge of said original document is processed to detect skew for the entire document image and to determine the appropriate correction to be applied;
   a skew correction module that generates modified image data which corresponds to said grayscale image data, said image data being skew corrected based upon the skew detected in said initially scanned lines, with at least a portion of said skew being eliminated from said grayscale image data in real-time;
   an image rendering module that converts said skew corrected grayscale image data to an output device format for use by a digital output device;
   a memory for storing said formatted image data;
   an image editing module that (i) retrieves said output formatted image data from said memory; and (ii) removes output formatted image data that is located outside a border of said document; and
   an output device configured to provide visible reproductions of said output device formatted image data.

4. The system of claim 3, wherein said image processor is further configured to receive grayscale image data including a digital representation of an original document bearing a continuous tone image.

5. The system of claim 3, wherein said output device is further configured to print said output device formatted image data.

6. The system of claim 3, wherein said image processor is further configured to receive grayscale image data provided by a raster input scanner.

7. The system of claim 3, wherein said grayscale image data subset consists of all of the pixels in the first 100 scanlines of said grayscale image data.

* * * * *